United States Patent [19]

Semmler

[11] Patent Number: 4,699,363

[45] Date of Patent: Oct. 13, 1987

[54] FRAMING JIG

[76] Inventor: James Semmler, R.R.I. Box 985, Rapid City, S. Dak. 55702

[21] Appl. No.: 776,833

[22] Filed: Sep. 17, 1985

[51] Int. Cl.⁴ .............................................. B23Q 3/02

[52] U.S. Cl. ...................................... 269/91; 269/152; 269/157; 269/303

[58] Field of Search ........................ 269/152, 157-159, 269/91-94, 303, 315

[56] References Cited

U.S. PATENT DOCUMENTS

| | | | |
|---|---|---|---|
| 24,102 | 5/1959 | Cryer . | |
| 214,035 | 4/1879 | Harrington | 269/157 |
| 1,011,805 | 12/1911 | Jones . | |
| 1,112,729 | 10/1914 | Swanson . | |
| 1,410,060 | 3/1922 | Harter | 269/91 |
| 1,543,419 | 6/1925 | Burns | 269/157 |
| 2,236,439 | 3/1941 | McKenna . | |
| 2,541,508 | 2/1951 | Fleming . | |
| 2,567,586 | 9/1951 | Werder . | |
| 2,911,022 | 11/1959 | Brown . | |
| 2,991,669 | 7/1961 | Stock | 269/152 |
| 3,083,007 | 3/1963 | Campfield . | |
| 3,124,181 | 3/1964 | Clemans | 269/315 |
| 3,189,341 | 6/1965 | Maurus . | |
| 3,642,269 | 2/1972 | Ladd . | |
| 3,743,566 | 7/1973 | Louthan et al. . | |
| 3,888,477 | 6/1975 | Tate . | |
| 4,252,304 | 2/1981 | Pettican . | |
| 4,356,849 | 11/1982 | Fredrickson . | |
| 4,445,677 | 5/1984 | Hansen et al. . | |

FOREIGN PATENT DOCUMENTS

| | | | |
|---|---|---|---|
| 929271 | 6/1955 | Fed. Rep. of Germany | 269/158 |

*Primary Examiner*—Robert C. Watson

*Attorney, Agent, or Firm*—Fulwider, Patton, Rieber, Lee & Utecht

[57] ABSTRACT

A framing jig for fabricating subassemblies for use in the construction of buildings. The jig has a supporting base defining a horizontal work surface, an end alignment stop defining a vertical transverse plane, a plurality of stanchions defining a vertical longitudinal plane, and a plurality of levers carried by the stanchions. Two or more parallel wooden members to be fabricated into a header or other subassembly are positioned in abutment with the end alignment stop and adjacent the stanchions. Each lever includes a flat portion movable from a resting position above the members to a clamping position in engagement with the edges of the members. The members can be nailed together when clamped by the lever. A bias spring associated with each lever urges the lever toward its resting position.

15 Claims, 7 Drawing Figures

FRAMING JIG

BACKGROUND OF THE INVENTION

1. Field of the Invention

The present invention relates generally to a framing jig, and more particularly to a framing jig for clamping a plurality of wooden members or the like into a predetermined relationship with one another.

2. The Prior Art

During the construction of wood frame buildings, numerous framing subassemblies such as headers, window jambs, door jambs, partition blocks, corner blocks, or the like must be fabricated. A window header, for example, is commonly fabricated by nailing together a pair of 2×6 wooden members to form a 4×6 header, a pair of 2×8s to form a 4×8 header, or a pair of 2×12s to form a 4×12 header. These wooden members must be held in precise parallel, transverse and longitudinal alignment with one another while they are being nailed together, but it is a clumsy and time-consuming chore to hold them manually while simultaneously nailing them. Power driven header fabricating machines have been developed but are expensive and too bulky to take to a construction site. Accordingly there is a need for a simple, inexpensive way to hold a plurality of wooden members or the like in alignment with each other for fabrication into subassemblies for use in the construction of buildings.

Although several different clamping devices are known to the art, none is suitable for clamping wooden members together for fabrication into subassemblies for buildings. For example, U.S. Pat. No. 24,102, issued to Cryer, discloses a work bench that clamps a work piece for jointing and squaring; U.S. Pat. No. 1,011,805, issued to Jones, discloses apparatus that clamps a workpiece onto a worktable; U.S. Pat. Nos. 2,236,439, issued to McKenna, and 3,743,566, issued to Louthan et al., disclose lever actuated clamps; and U.S. Pat. No. 4,252,304, issued to Pettican, discloses a workbench having a three part vice. None of these devices is capable of clamping a plurality of members in the required three-way alignment for fabrication into a subassembly for use in the construction of buildings, and hence there is still a need for a simple, inexpensive way to fabricate subassemblies such as headers. The present invention satisfies this need.

SUMMARY OF THE INVENTION

The present framing jig is adapted to support and locate a plurality of parallel wooden members or the like in longitudinal and transverse alignment with each other. The jig is manually operable with one hand, thereby leaving the other hand free to use a hammer or a nailing machine to nail the members together.

Briefly, the framing jig comprises a supporting base having an elongated work surface that supports the members to be nailed together; an end alignment stop on the work surface to define a vertical transverse plane; a set of lever stanchions and support stanchions disposed at intervals on the work surface to define a vertical longitudinal plane perpendicular to the vertical transverse plane; and a set of clamping levers carried by the lever stanchions. Each lever has a flat clamping surface that defines an upper horizontal plane parallel to the work surface when the lever is moved into a clamping position, a grip for moving that lever into its clamping position, and an associated spring that acts through a cable to bias the lever toward a resting position when the lever is not being used.

An operator uses the framing jig by placing members that will compose the subassembly being fabricated parallel to each other on the work surface, adjacent the stanchions and abutting the end alignment stop. When the members are in place, the operator grips one of the levers and moves it into its clamping position to clamp the members; then, while holding the lever in its clamping position with one hand, the operator nails the members together with a tool operated by the other hand. As soon as the lever is released, its associated spring returns it to its resting position. This process is repeated using each lever in turn until the members have been tightly secured to each other.

The lever stanchions have a plurality of lever pivot positions at various heights to match the various widths of commercially available wooden members, and means are provided to switch the levers from one pivot point to another according to the width of the members to be clamped.

In one embodiment, the springs for biasing the levers toward their resting positions are disposed below the work surface and the connecting cables are trained over guide pulleys and through holes in the work surface to connect the springs to their respective levers.

In another embodiment, the springs are disposed above the work surface within the interiors of channel shaped lever stanchions, and pulleys are used to guide the cables between the levers and the springs. A framing jig according to this embodiment may be supplied to a user as a set of pre-assembled modules comprising an end alignment stop, a plurality of lever stanchions with levers, springs and pulleys, and an optional plurality of support stanchions, adapted for mounting on a table or other supporting base to be supplied by the user.

The foregoing framing jig enables one person to clamp a plurality of members together for fabrication into a subassembly simply and easily and without the use of elaborate power-driven apparatus. Other aspects and advantages of the present invention will become apparent from the following more detailed description taken in conjunction with the accompanying drawings.

BRIEF DESCRIPTION OF THE DRAWINGS

FIG. 6 is a perspective view of an alternate embodiment comprising a set of pre-assembled modules provided for user installation on a user-supplied table;

DESCRIPTION OF THE PREFERRED EMBODIMENT

The present invention provides a simple, easy-to-use framing jig for fabricating subassemblies such as headers or the like for use in the construction of buildings, elminating both clumsy manual fabrication of such subassemblies and the use of elaborate power-driven header assembling machines.

Figure 1:
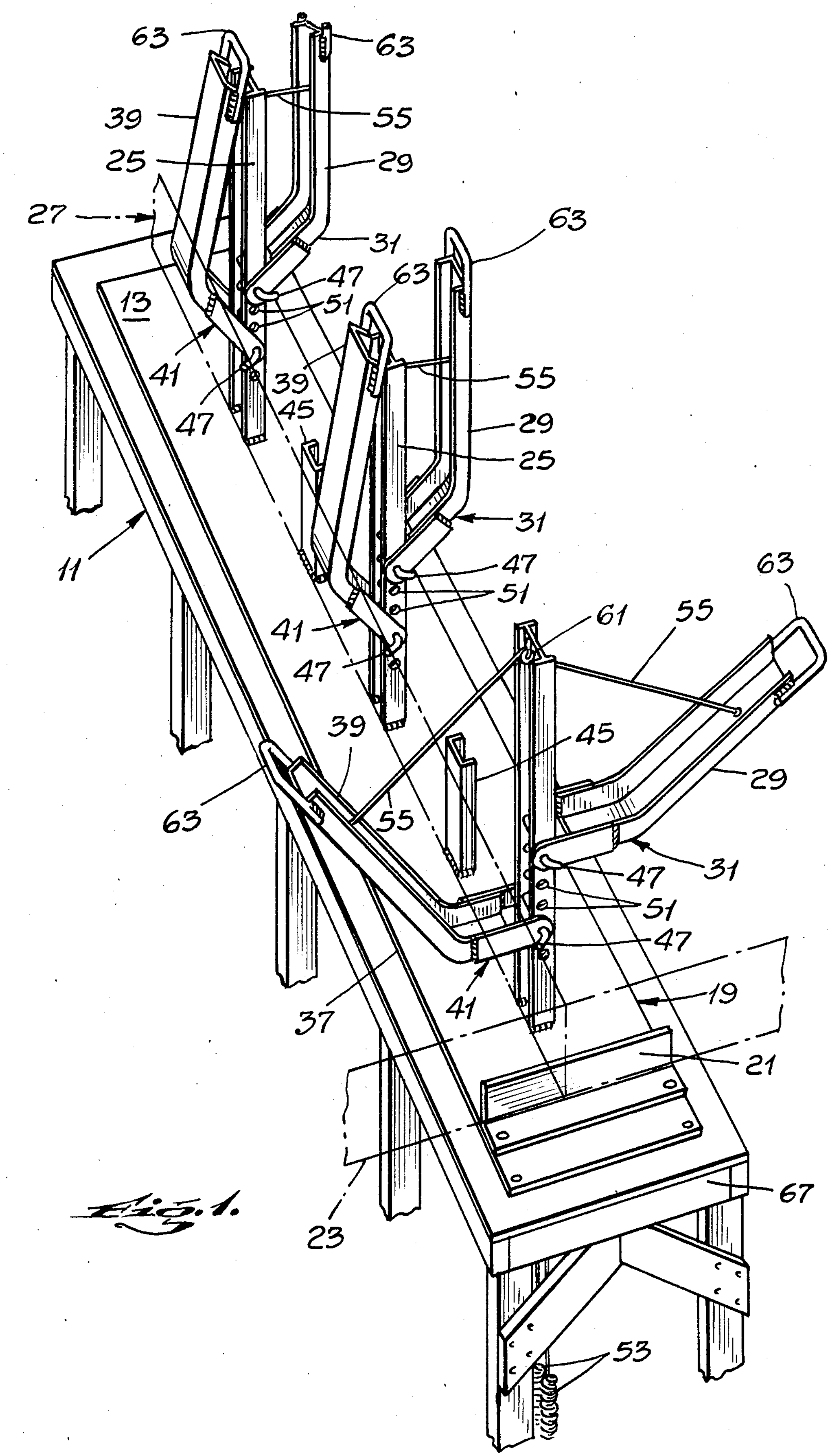
FIG. 1 is a perspective view of a framing jig according to the invention, showing two of the levers in their clamping position.
Figure 2:
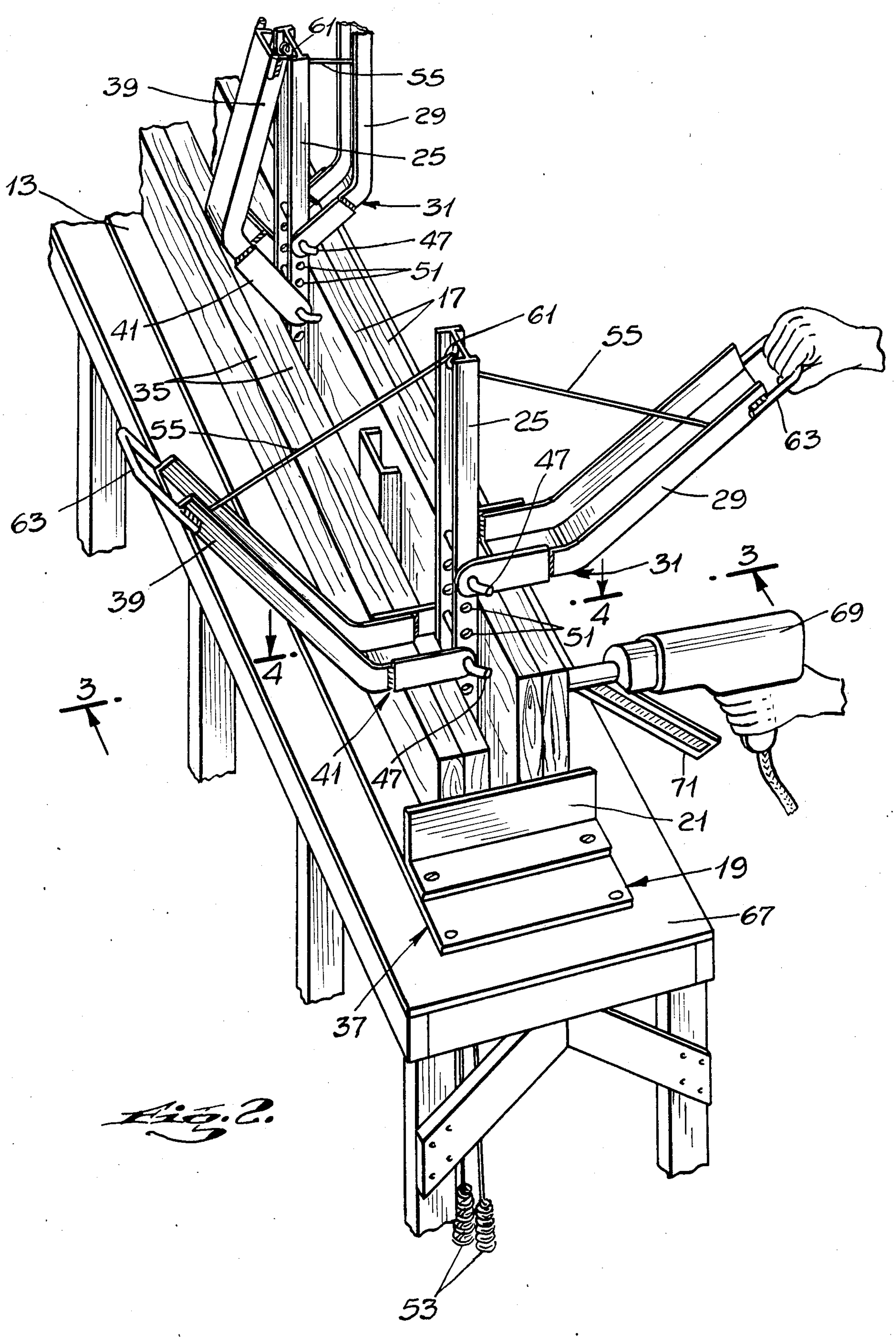
FIG. 2 is a perspective view of a portion of the framing jig of FIG. 1, showing a plurality of members being held in position by the levers in their clamping positions, and also showing a nailing machine being used to nail one set of wooden members together.
Figure 3:
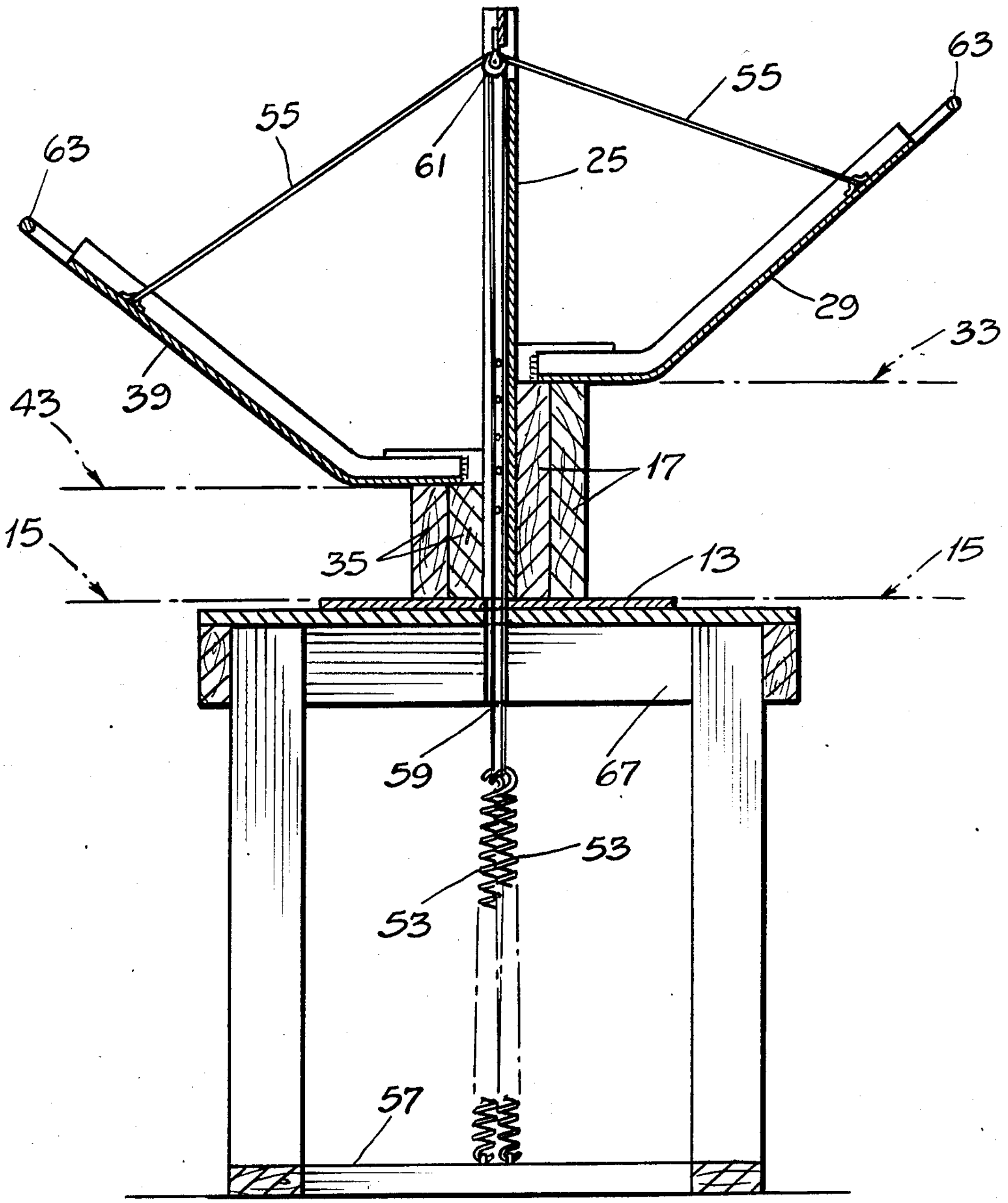
FIG. 3 is a section view taken along the line 3—3 of FIG. 2.

In accordance with the invention, a framing jig designated generally 11 as shown in FIGS. 1 through 3 comprises an elongated supporting base 13 defining a lower horizontal plane 15 and adapted to support a first plurality of wooden members 17 or the like adjacent a first long side 19 of the base 13; an end alignment stop 21 affixed to the base 13 adjacent a short side thereof, defining a vertical transverse plane 23, and adapted to engage an extremity of each member 17 in the plane 23; and a plurality of longitudinal lever stanchions 25 affixed to the base 13, defining a vertical longitudinal plane 27, and adapted to engage a side of one of the members 17 and thereby locate the sides of all the members 17 parallel to the plane 27.

Pivot ends of a plurality of levers 29 are pivotally attached to the stanchions 25 adjacent the first long side 19 of the base 13. Each lever 29 includes adjacent its pivot end a flat clamping surface 31 having a clamping position above and parallel to the lower horizontal plane 15 and defining a first upper horizontal plane 15 and defining a first upper horizontal plane 33 and further having a resting position above the plane 33, the surface 31 being adapted to engage an upper edge of each member 17 when the surface 31 is in said clamping position and thereby locate said upper edges in the plane 33.

A second plurality of wooden members 35 or the like may be positioned adjacent a second long side 37 of the base 13, an extremity of each of the members 35 also being engaged by the stop 21 in the transverse plane 23 and the sides of the members 35 also being located by the stanchions 25 parallel to the longitudinal plane 27. Pivot ends of a plurality of levers 39 are pivotally attached to the stanchions 25 adjacent the second long side 37 of the base 13. Each lever 39 includes adjacent its pivot end a flat clamping surface 41 having a clamping position above and parallel to the lower horizontal plane 15 and defining a second upper horizontal plane 43 and further having a resting position above the plane 43, the surface 41 being adapted to engage an upper edge of each member 35 when the surface 41 is in said clamping position and thereby locate said upper edges in the plane 43.

An auxiliary support stanchion 45 may be disposed between the lever stanchions 25 in the longitudinal plane 27 to provide further support for the members 17 and 35.

Figure 4:
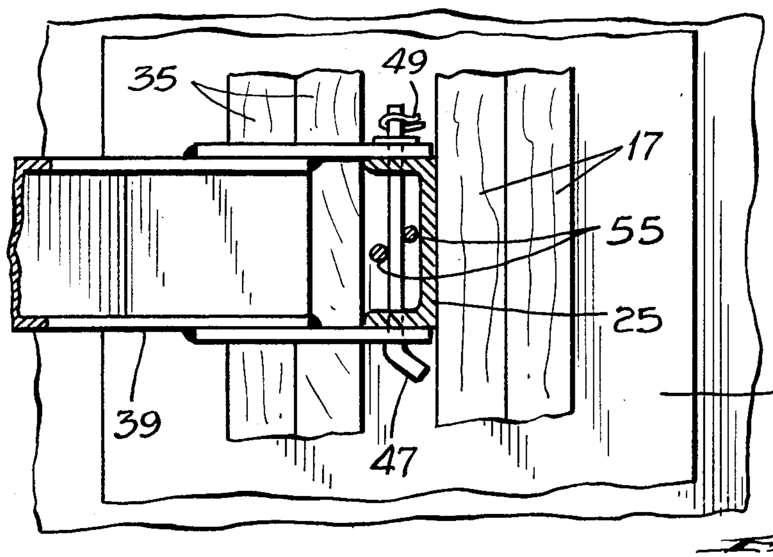
FIG. 4 is a view taken along the line 4—4 of FIG. 2.

The levers 29 and 39 are pivotally attached to the stanchions 25 by means of pivot pins 47. The levers 29 and 39 and the stanchions 25 are formed of channel iron, and each pivot pin 47 extends through holes in both legs of the pivot end of the associated lever and through corresponding holes in both legs of the stanchion 25, thereby attaching the associated lever to the stanchion 25. The pivot pin is held in place by means of a clip 49 as shown in FIG. 4.

Each stanchion 25 has a plurality of horizontally aligned parallel holes 51 extending through its legs, and a given lever 29 or 39 can be attached to the stanchion 25 by means of the pivot pin 47 extending through any of said parallel holes. By relocating a given lever 29 or 39 from one of the holes 51 to another, the distance between the lower horizontal plane 15 and the upper horizontal planes 33 or 43, respectively, can be adjusted according to the width of the members to be clamped.

Each lever 29 and 39 may be biased toward its resting position by a spring 53 acting through a cable 55. One end of the spring 53 is affixed to a base 57 beneath the base 13 and the other end of the spring 53 is connected to one end of the cable 55. The cable 55 is routed through a hole 59 in the base 13 and trained about a pulley 61 attached to the stanchion 25, and the other end of the cable 55 is affixed to an intermediate point along its associated lever.

A grip 63 is carried by each of the lever 29 and 39 to facilitate operation of the levers by hand. A table 67 or the like may be provided to carry the support base 13 at a convenient working height.

To fabricate a subassembly such as a header from the members 17, an operator first position the members 17 adjacent the stop 21 and the stanchions 25 and then with one hand pulls one of the levers 29 down to clamp the members 17 in position and with the other hand nails the members 17 together with a suitable tool such as a nailing machine 69 having a magazine 71 of nails, the stanchion 25 serving as a backstop for the members 17 when the nails are being driven in. The process is then repeated, using the other lever 29 in turn. For high volume production, two operators can fabricate subassemblies at the same time, one operator using the levers 29 to fabricate one subassembly from the members 17 on one side of the stanchions 25, and the other operator using the levers 39 to fabricate another subassembly from the members 35 on the other side of the stanchions 25.

Figure 5:
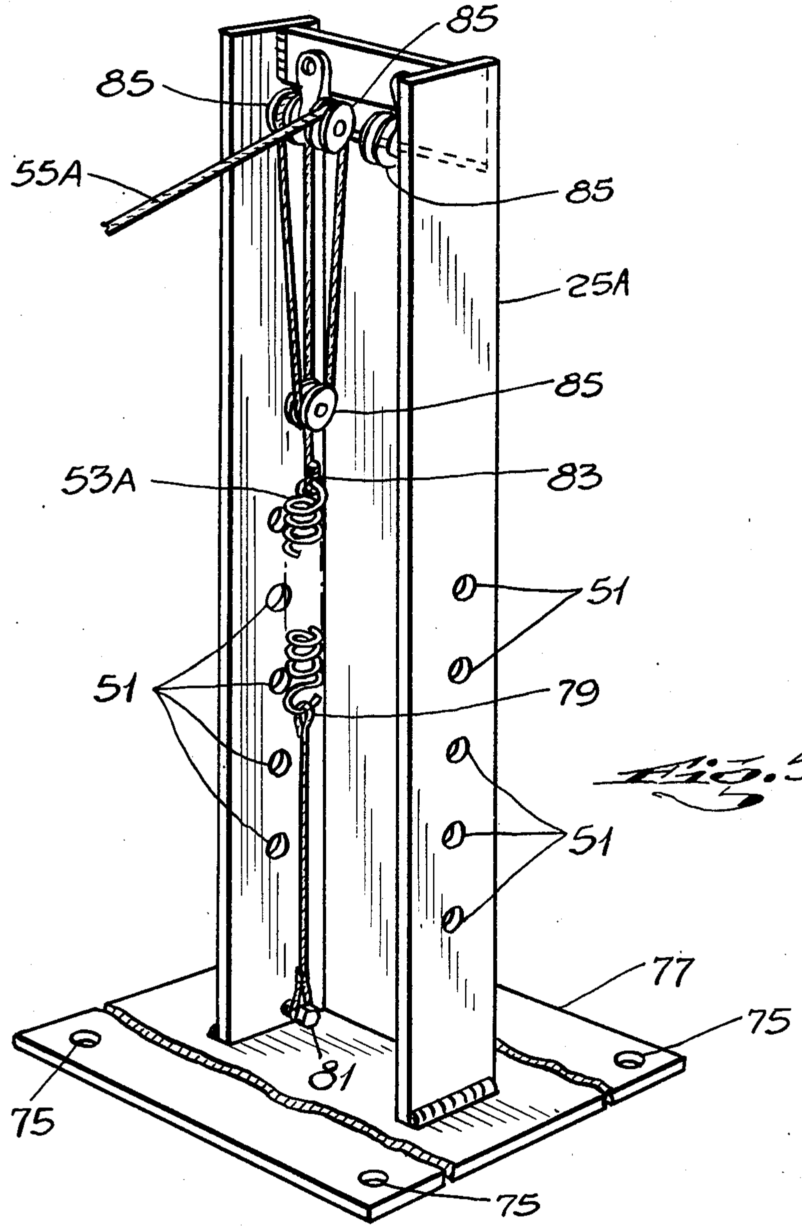
FIG. 5 is a detail perspective view of a channel-shaped stanchion having a spring disposed within the channel area.

An alternate embodiment of the invention, adapted to be provided in pre-assembled modules for installation on a user-supplied supporting base, is shown in FIGS. 5 and 6. This embodiment is similar in many respects to the one shown in FIGS. 1 through 4 and for convenience components in FIGS. 5 and 6 that are similar to components in FIGS. 1 through 4 are assigned the same reference numerals, analogous but changed components are assigned the same reference numerals accompanied by the letter "A", and different components are assigned different reference numerals.

In accordance with the alternate embodiment, a framing jig is provided for installation on a user-supplied supporting base such as a table 73 or the like. The jig comprises an end alignment stop 21A having mounting holes 75 and adapted to be affixed to the table 73 by suitable fasteners such as bolts or the like, and a plurality of longitudinal lever stanchions 25A, each stanchion affixed to a mounting plate 77 also having mounting holes 75 and adapted to be affixed to the table 73 by suitable fasteners. The stanchions 25A carry levers 29 and 39 attached to the stanchions 25A by means of pivot pins 47 inserted through holes in the pivot ends of the levers and through the holes 51 in the stanchions 25A.

Each lever 39 is biased toward its resting position by a spring 53A disposed within the channel area of the associated stanchion 25A. One end 79 of the spring 53A is anchored to an anchor pin 81 at the lower extremity of the stanchion 25A. The other end 83 of the spring 53A is connected to its associated lever through a cable 55A that is trained about a plurality of pulleys 85 alternately attached to the stanchion 25A and to the end 83 of the spring 53A. In like fashion, each lever 29 is biased towards its resting position by a similar spring assembly (shown).

Figure 7:
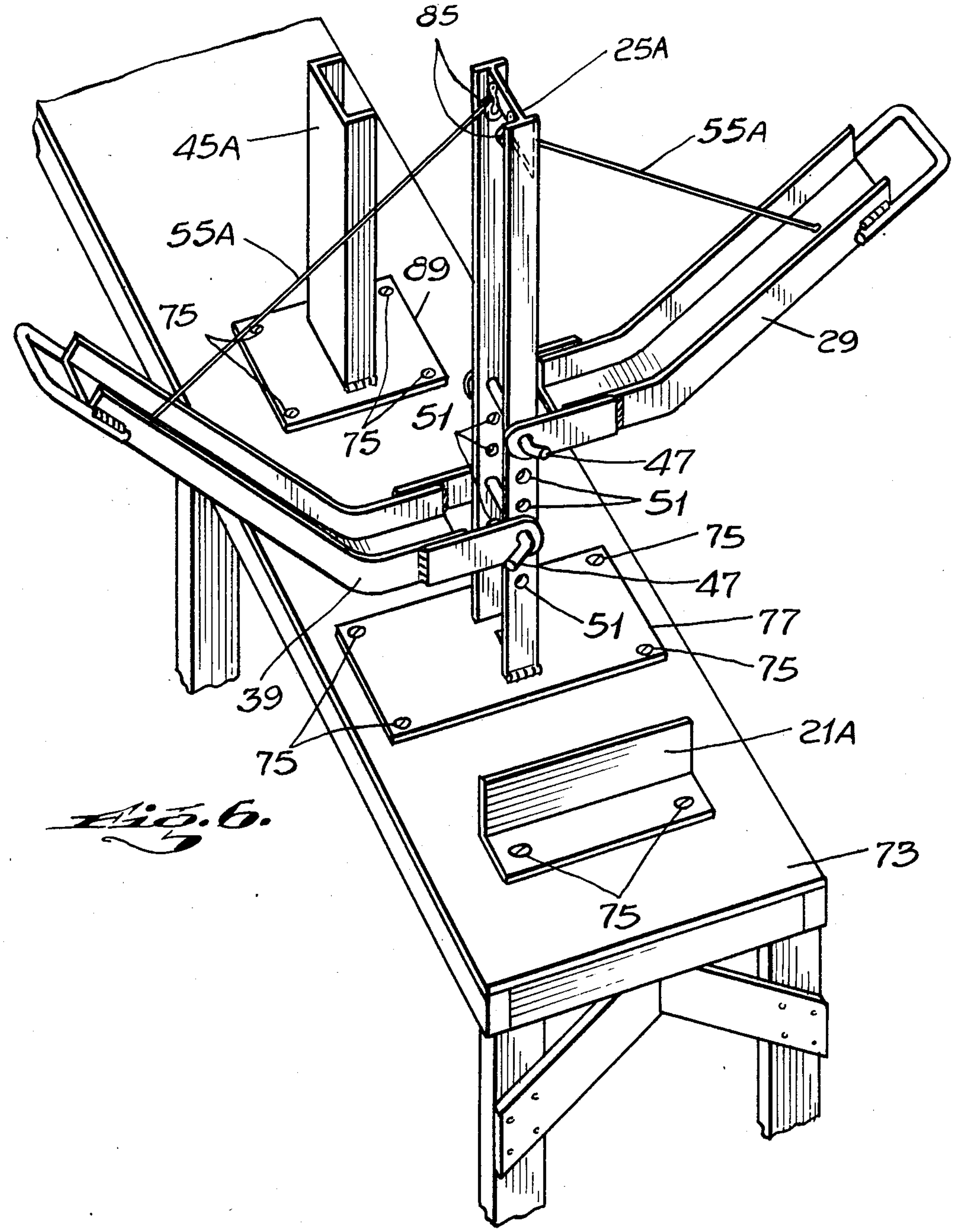
FIG. 7 is a fragmented perspective view of an alternative embodiment comprising a spring disposed directly between the lever and the stanchion.
Figure 7:
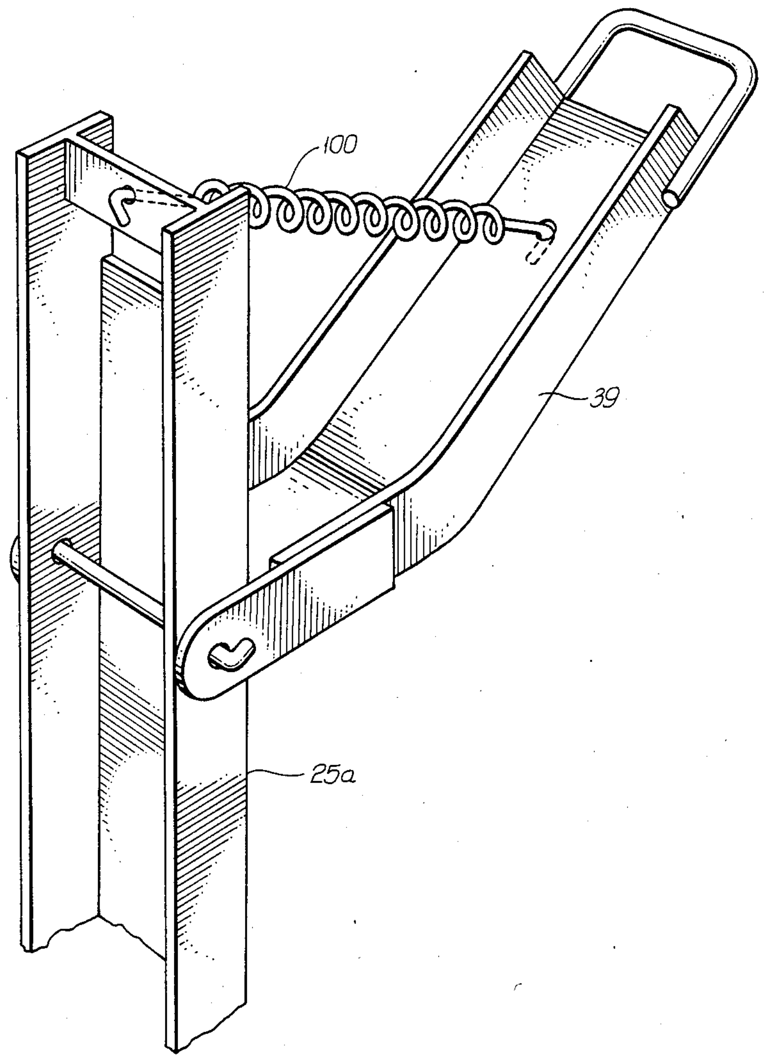

In an alternate biasing arrangement (not), cables and pulleys are not used and a spring 100 is disposed directly between the lever 39 and the stanchion 25A as shown in FIGS. 7, one end of the spring 100 being attached to the lever 39 and the other end to the stanchion 25A.

An auxiliary support stanchion 45A affixed to a mounting plate 39 also having mounting holes 75 and adapted to be affixed to the table 73 by suitable fasteners may be disposed between the lever stanchions 25A to provide further longitudinal support if necessary.

A framing jig embodying the present invention can be used to fabricate many subassemblies in a short period of time without either the clumsiness inherent in manual fabrication of such subassemblies or the expense of a power-driven jig. The jig can be quickly adapted to fabricate subassemblies of any of a number of different widths. The jig can be used by two workers at the same time for higher volume production, and each of its two sides can be set up for a different commonly used width, thereby eliminating any need to change the setup when fabricating subassemblies of either width. Additionally, a framing jig according to the alternate embodiment is provided as an easily transported set of pre-assembled modules for installation on a user-supplied supporting base.

Although one specific embodiment of this invention has been described and illustrated, it is to be understood that the invention is not to be limited to the specific forms or arrangements of parts so described and illustrated, and that various change can be made within the scope of the invention. For example, varying numbers of lever stanchions and auxiliary stanchions could be used, the end alignment stop and the stanchions could be secured to the supporting base by other mounting means, the stanchions and levers could be made out of material having any of a variety of shapes, and a single-sided jig having only one lever per stanchion could be constructed. It is therefore to be understood that, within the scope of the appended claims, the invention may be practiced otherwise than as specifically described.

I claim:

1. A framing jig for holding side by side a first plurality of members, the first plurality all having the same height and parallel sides, and for holding side by side a second plurality of members, the second plurality all having the same height and parallel sides, in fixed relationships relative to a lower horizontal plane, a vertical transverse plane, and a vertical longitudinal plane, the jig comprising:

a supporting base having an elongated work surface defining the lower horizontal plane and adapted to support the first plurality of members adjacent a first long side of the base and the second plurality of members adjacent a second long side of the base;

end alignment stop means affixed to the base, defining the vertical transverse plane, adapted to engage an extremity of each of the first plurality of members and thereby locate the same in fixed relationship to the vertical transverse verse plane, and adapted to engage an extremity of each of the second plurality of members and thereby locate the same in fixed relationship to the vertical transverse plane;

a plurality of longitudinal lever stanchions affixed to the base, defining the vertical longitudinal plane perpendicular to the vertical transverse plane and generally parallel with and generally centered between the first and second long sides of the base, a first side of the stanchions adapted to engage a side of one of the first plurality of members and thereby locate the sides of said members parallel to the vertical longitudinal plane and adjacent the first long side of the base, and an opposing second side of the stanchions adapted to engage a side of one of the second plurality of members and thereby locate the sides of said members parallel to the vertical longitudinal plane and adjacent the second long side of the base;

a first plurality of levers, each lever pivotally attached to a different stanchion on the first side thereof and including a flat clamping surface, each such surface having a clamping position above and parallel to the lower horizontal plane and defining the first upper horizontal plane, the clamping surface further having a resting position above the first upper horizontal plane, the clamping surface adapted when in the clamping position to releasably engage an upper edge of each of the first plurality of members and thereby locate said upper edges in the first upper horizontal plane; and a second plurality of levers, each lever pivotally attached to a different stanchion on the second side thereof and including a flat clamping surface, each such surface having a clamping position above and parallel to the lower horizontal plane and defining the second upper horizontal plane, the clamping surface further having a resting position above the second upper horizontal plane, the clamping surface adapted when in the clamping position to releasably engage an upper edge of each of the second plurality of members and thereby locate said upper edges in the second upper horizontal plane.

2. A framing jig according to claim 1 and further comprising a support stanchion, disposed between two lever stanchions and in the vertical longitudinal plane, a first side of said support stanchion being adapted to engage the side of the one of the first plurality of members adjacent the lever stanchions, and an opposing second side of said support stanchion being adapted to engage the side of the one of the second plurality of members adjacent the lever stanchions, and thereby support the sides of the members.

3. A framing jig according to claim 1 wherein each lever stanchion has a plurality of pivot points at predetermined intervals along the stanchion, and comprising in addition removable pivot means for pivotally connecting one of the first plurality of levers to a lever stanchion on the first side thereof at one of said pivot points and one of the second plurality of levers to the stanchion on the second side thereof at another of said pivot points.

4. A framing jig according to claim 1 and further comprising bias means operative to urge each lever toward its resting position.

5. A framing jig according to claim 4 wherein the supporting base has a hole therethrough adjacent a stanchion and wherein the bias means for a lever carried by said stanchion comprises:

pulley means disposed above the work surface;

spring means disposed below the work surface; and a cable, trained about the pulley means and through the hole, connecting the spring means to the lever, the spring means operative through the cable to urge the lever toward its resting position.

6. A framing jig according to claim 4 wherein the bias means for a lever carried by a stanchion comprises:

pulley means disposed above the work surface;

spring means disposed above the work surface adjacent the stanchion; and a cable, trained about the pulley means, connecting the spring means to the lever, the spring means operative through the cable to urge the lever toward its resting position.

7. A framing jig according to claim 4 wherein the bias means for a lever carried by a stanchion comprises a spring disposed between and connected to the lever and the stanchion and operative to urge the lever towards its resting position.

8. A framing jig for holding side by side a first plurality of members, the first plurality all having the same height and parallel sides, and for holding side by side a second plurality of members, the second plurality all having the same height and parallel sides, in fixed relationships relative to a lower horizontal plane, a vertical transverse plane, and a vertical longitudinal plane, for installation on a supporting base having an elongated work surface defining said lower horizontal plane, the base being adapted to support the first plurality of members adjacent a first long side of the base and the second plurality of members adjacent a second long side of the base, the jig comprising:

end alignment stop means adapted to be affixed to the base, the stop means when affixed to the base defining the vertical transverse plane, the stop means adapted to engage an extremity of each of the first plurality of members and thereby locate the same in fixed relationship to the vertical transverse plane, the stop means also adapted to engage an extremity of each of the second plurality of members and thereby locate the same in fixed relationship to the vertical transverse plane;

a plurality of longitudinal lever stanchions adapted to be affixed to the base, the stanchions when affixed to the base defining the vertical longitudinal plane perpendicular to the vertical transverse plane and generally parallel with and generally centered between the first and second long sides of the base, a first side of the stanchions adapted to engage a side of one of the first plurality of members and thereby locate the sides of said members parallel to the vertical longitudinal plane and adjacent the first long side of the base, and an opposing second side of the stanchions adapted to engage a side of one of the second plurality of members and thereby locate the sides of said members parallel to the vertical longitudinal plane and adjacent the second long side of the base;

a first plurality of levers, each lever pivotally attached to a different stanchion on the first side thereof and including a flat clamping surface, each such surface having a clamping position above and parallel to the lower horizontal plane and defining the first upper horizontal plane, the clamping surface further having a resting position above the first upper horizontal plane, the clamping surface adapted when in the clamping position to releasably engage an upper edge of each of the first plurality of members and thereby locate said upper edges in the first upper horizontal plane; and a second plurality of levers, each lever pivotally attached to a different stanchion on the second side thereof and including a flat clamping surface, each such surface having a clamping position above and parallel to the lower horizontal plane and defining the second upper horizontal plane, the clamping surface further having a resting position above the second upper horizontal plane, the clamping surface adapted when in the clamping position to releasably engage an upper edge of each of the second plurality of members and thereby locate said upper edges in the second upper horizontal plane.

9. A framing jig according to claim 8 and further comprising a support stanchion, adapted to be affixed to the base between two lever stanchions and in the vertical longitudinal plane, a first side of said support stanchion being adapted to engage the side of the one of the first plurality of members adjacent the lever stanchions, and an opposing second side of said support stanchion being adapted to engage the side of the one of the second plurality of members adjacent the lever stanchions, and thereby support the sides of the members.

10. A framing jig according to claim 8 wherein each lever stanchion has a plurality of pivot points at predetermined intervals along the stanchion, and comprising in addition removable pivot means for pivotally connecting one of the first plurality of levers to a lever stanchion on the first side thereof at one of said pivot points and one of the second plurality of levers to the stanchion on the second side thereof at another of said pivot points.

11. A framing jig according to claim 1 wherein the end stop alignment means comprises an end stop which engages the extremities of the first and second pluralities of members and locates the same in the vertical transverse plane.

12. A framing jig according to claim 8 wherein the end stop alignment means comprises an end stop which engages the extremities of the first and second pluralities of members and locates the same in the vertical transverse plane.

13. A framing jig according to claim 8 and further comprising bias means operative to urge each lever toward its resting position.

14. A framing jig according to claim 13 wherein in the bias means for a lever carried by a stanchion comprises:

pulley means disposed on the stanchion;

spring means disposed adjacent the stanchion; and a cable, trained about the pulley means, connecting the spring means to the lever, the spring means operative through the cable to urge the lever toward its resting position.

15. A framing jig according to claim 13 wherein the bias means for a lever carried by a stanchion comprises a spring disposed between and connected to the lever and the stanchion and operative to urge the lever towards its resting position.

* * * * *

UNITED STATES PATENT AND TRADEMARK OFFICE
CERTIFICATE OF CORRECTION

PATENT NO. : 4,699,363

DATED : October 13, 1987

INVENTOR(S) : James Semmler

It is certified that error appears in the above-identified patent and that said Letters Patent is hereby corrected as shown below:

Column 2, line 62, delete "and";

Column 2, line 65, after "table;" add --and--;

Column 4, line 16, delete "lever" and insert --levers--;

Column 4, line 21, delete "position" and insert --positions--;

Column 4, line 29, delete "lever" and insert --levers--;

Column 5, line 3, delete "(shown)" and insert --(not shown)--;

Column 5, line 4, delete "(not)";

Column 5, line 10, delete "39" and insert --89--; and

Column 5, line 62, delete "verse".

Signed and Sealed this

Twelfth Day of April, 1988

*Attest:*

DONALD J. QUIGG

*Attesting Officer*

*Commissioner of Patents and Trademarks*